June 7, 1960
P. P. DEMAY
2,939,486
PNEUMATIC ACTUATOR
Filed April 3, 1958
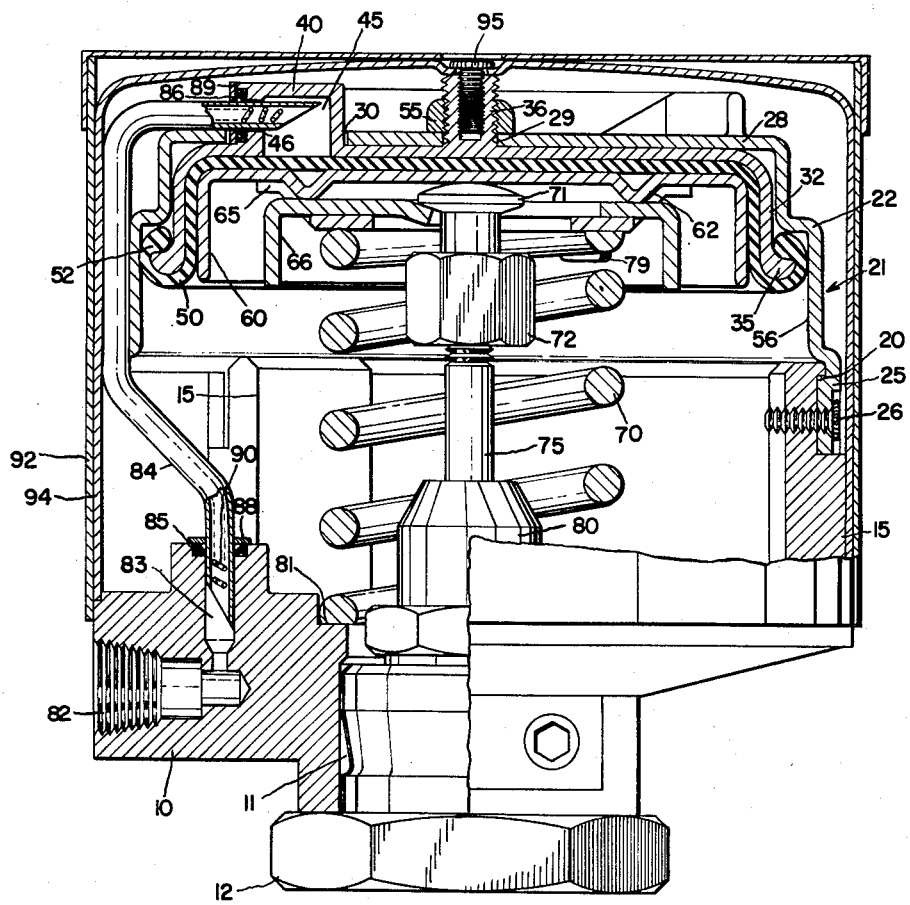
INVENTOR.
PETER P. DEMAY
BY *Joseph E. Ryan*
ATTORNEY

2,939,486
PNEUMATIC ACTUATOR

Peter P. Demay, Chicago, Ill., assignor to Minneapolis-Honeywell Regulator Company, Minneapolis, Minn., a corporation of Delaware Filed Apr. 3, 1958, Ser. No. 726,087

4 Claims. (Cl. 137—788)

My invention relates to pneumatic actuators and more particularly to an improved pneumatic actuator particularly adapted to use in connection as a valve operator.

The improved pneumatic actuator of the present invention is directed to a simplified design and arrangement of parts in which the support and a wall for the chamber of the diaphragm are clamped together to secure the lip for the diaphragm and form the chamber with the diaphragm and in which the support provides a skirt or surface on which the diaphragm may roll to provide a long stroke and a tight seal for the variable chamber. These and other details of the improved pneumatic actuator provide a simplified design which is readily adapted to simplified manufacture such as stamping with a minimum of assembling and maintenance. It is therefore an object of this invention to provide an improved pneumatic actuator design which is simple and economical to manufacture and maintain. Other objects will become apparent from the reading of the attached description together with the drawing.

My improved pneumatic actuator as shown in the drawing is comprised of a base member which is generally cylindrical in form and identified at 10 having a centrally located aperture indicated at 11 extending therethrough and terminating in a flange portion 12 having a hexangular periphery which may be internally threaded (not shown) adapting the base member for mounting on the device to be actuated, such as a valve body (not shown). Base member 10 includes a plurality of upstanding flanged sections 15 positioned along the top peripheral surface of the base and having a recess indicated at 20 thereon for purposes to be later noted. Mounted on the upstanding flanged portions is a cup shaped annular member or annular support 21 whose peripheral side surface has a shoulder section therein indicated at 22 to give a lesser dimension for one portion of the support member than the other and with the lower extremities of the support member 21 terminating in the plurality of flanges 25 which fit into the recesses 20 of the supporting flanges 15 of the base to mount the member 21 on the base flanges 15. This supporting member is secured to the base flanges through screw means such as is indicated at 26 which are threaded through tapped apertures in each of the members. The support member 21 includes a closed extremity or end section 28 which has a pair of apertures therein, one indicated at 29 and the other at 30 through which portions or projections, to be later identified, of an inner cup shaped member 32 extend. The cup shaped member 32 has a flanged or lipped periphery indicated at 35 and a centrally located threaded extension or hub 36 extending from the closed end of the member 32. Also included on member 32 is a section 40 which projects through the end section 28 of the support 21. The hub 40 has a recessed area 45 therein and an aperture 46 leading thereto which provides an air conduit means or inlet means to a variable chamber formed by the cup shaped member 32 and a cup shaped diaphragm 50 which is nested in the cup shaped member and has a lipped periphery 52 which is turned over a flanged periphery 35 of the cup shaped member 32. The diaphragm 50 and the cup shaped member 32 fit into the support member 21 and the physical dimensions of the parts are such that the shoulder portion 22 of the support member 21 cooperates with the flanged periphery 35 of the cup shaped member 32 to clamp the lip 52 of the diaphragm 50 therebetween. The members 32 and 21 are drawn together by means of a nut indicated at 55 which is threaded on to the threaded extension 36 of the cup shaped member 32 above the end section 28 of the support member 21 to draw the cup shaped member 32 toward the end section 28 of the support member 21 clamping the lipped periphery 52 of the diaphragm 50 therebetween. The diaphragm under the presence of air pressure entering from the inlet 46 through the recess 45 will fill the chamber between the diaphragm and the member 32 causing the wall portions of the cup shaped diaphragm to roll on to the enlarged or skirt section of the support 21 along the surface indicated at 56 in a rolling type seal. Positioned within the cup shaped diaphragm, that is telescopically fitted therein, is a support member, indicated at 60, designed to maintain the shape of the diaphragm under expansion of the chamber to provide the rolling action of the side walls of the diaphragm on the surfaces 56 of the support member 21 and to transmit the thrust from the diaphragm to the member to be operated thereby. The member 60 has a plurality of depressed flanges 62 which connect with a conventional key and locking arrangement formed of parts 65 and 66 and which serve as the support for the end of the bias spring indicated at 70. These parts connect the knob section indicated at 71 on a connector 72 in an operating linkage for the device to be operated. The key and latch parts 65—66 together with the knob 71 are disclosed in my prior patent 2,770,442 on Control Apparatus issued November 13, 1956. The headed knob 71 through the nut or connector 72 is adapted to be connected to a threaded shaft indicated at 75 of the actuator whose packing or seal assembly is indicated generally at 80, but whose remaining details are not shown. The knob 71 is connected through the key and latch sections 65 and 66 to the actuator. The spring 70 which rests at one extremity against the latch section is maintained in position by flanges 79 mounted on the latch section such that it will remain centrally located with respect to the knob 71 and shaft 75 while the opposite extremity of the spring rests in a recessed shoulder 81 of the base concentric with the aperture 11 therein. Spring 70 provides the return force for the actuator urging the key and latch sections 65, 66 and support plate 60 against the diaphragm while the key 66 holds the head 71 and the nut 72 and hence the shaft 75, of the device to be operated effectively against the support plate 60. Thus, the shaft will be raised by the spring and be urged downwardly by the thrust support member 60 operating against the key sections 65 and 66 and also against the upper surface of the knob 71 to urge the shaft downward upon the expansion of the variable chamber. The key section 65 has tapered sides to fit against the notches or dents 62 of the support 60 to center the same.

Air is supplied to the variable chamber through a conduit connection 82 in the base having a transversely extending conduit 83 therein into which is positioned a flexible tube 84 leading to the hub section 40 of the cup shaped member 32 and into which the flexible conduit is positioned through the aperture 46. The flexible conduit utilizes suitable sealing means indicated at 85, 86 in the base and hub portions respectively to seal the conduit 84 to these respective parts, the sealing portions being held in position by lock rings or clips 88, 89 respectively. Thus, the air is supplied through the conduit portion 82 and the flexible conduit 84, which as indicated in the drawing, has a shape forming spring 90 positioned therein, to the hub portion 40 and the variable chamber between the diaphragm 50 and the cup shaped member 32. Air pressure in the chamber moves the diaphragm and hence the cup shaped member 60 down against the knob 71 to urge the shaft 75 of the device to be operated downward for operative movement against the bias or force of the spring 70. Upon the drop in air pressure in the variable chamber, the spring 71 forces the cup shaped member 60 and the diaphragm 50 upward to reduce the volume of the variable chamber forcing the air out through the conduit 84 and connection 82 in a conventional manner. The actuator includes cover parts 92, 94 respectively which fit over the base 10 with part 94 being secured in position by a screw means 95 fitted into the extension 36 of the base member 32.

The subject pneumatic actuator is formed of a plurality of parts readily adapted to stamping operation and which may be simply assembled to provide an arrangement in which the diaphragm is positively sealed and has a surface upon which to roll as the variable chamber expands or increases in size. The present arrangement of the parts provides a simplified means for assembly and disassembly of the operator and for attaching the same to the device to be operated thereby.

In considering this invention it should be remembered that the disclosure is intended to be illustrative only and that the invention should be limited only by the appended claims.

I claim:

1. A pneumatic actuator comprising, a circular base member with a centrally located aperture therein and a plurality of upstanding flange portions, a first cup shaped member having a shoulder portion intermediate along its peripheral side extent and a plurality of projections which mount on and are adapted to be secured to said flange portions on said base member, a second cup shaped member fitted into said first member and terminating in an outwardly extending flanged periphery positioned adjacent said shoulder portion of said first member, a threaded hub means integral with said second member and extending outwardly from the center of the closed end of said member and through a centrally located aperture in said first member, a cup shaped diaphragm fitted into said second cup shaped member and having an outwardly extending peripheral bead turned over said flanged periphery of said second cup shaped member and positioned between the shoulder portion of said first cup shaped member and said flanged periphery of said second cup shaped member, nut means positioned over said threaded hub portion adjacent said first member and operative to draw said first and second members together and clamp the beaded periphery of said diaphragm between said members, an air conduit means integral with said second member and extending through the aperture in the end surface of said first member providing an air passage to a chamber formed between said diaphragm and said second member, a spring retaining plate positioned on the under surface of said diaphragm, spring means positioned between said plate and said base member, and means connected to said spring retaining plate and adapted to connect an operating lever of the device to be operated by said actuator.

2. A pneumatic actuator comprising, a circular base member with a centrally located aperture therein and a plurality of upstanding flange portions, a first annular member with an end support member having a shoulder portion intermediate along its peripheral side extent and a plurality of projections which mount on and are adapted to be secured to said flange portions on said base member, a cup shaped member fitted into said annular member and terminating in an outwardly extending flanged periphery positioned adjacent said shoulder portion of said annular member, a hub means integral with said cup shaped member and extending outwardly from the center of the closed end of said member and through a centrally located aperture in said end support of said annular member, a cup shaped diaphargm fitted into said cup shaped member and having an outwardly extending peripheral bead turned over said flanged periphery of said cup shaped member and positioned between the shoulder portion of said annular member and said flanged periphery of said cup shaped member, means positioned over said hub means adjacent said annular member and operative to draw said annular and cup shaped members together and clamp the beaded periphery of said diaphragm between said members, an air conduit means integral with said cup shaped member and extending through the aperture in the end support of said annular member providing an air passage to a chamber formed between said diaphragm and said cup shaped member, a spring retaining plate positioned on the under surface of said diaphragm, spring means positioned between said plate and said base member, and means positioned adjacent said spring retaining plate and adapted to connect an operating lever of the device to be operated by said actuator.

3. A pneumatic actuator comprising, a circular base member with a centrally located aperture therein and a plurality of upstanding flange portions, a first cup shaped member having a shoulder portion intermediate along its peripheral side extent and a plurality of projections which mount on and are adapted to be secured to said flange portions on said base member, a second cup shaped member fitted into said first member and terminating in an outwardly extending flanged periphery positioned adjacent said shoulder portion of said first member, a threaded hub means integral with said second member and extending outwardly from the center of the closed end of said member and through a centrally located aperture in said first member, a cup shaped diaphragm fitted into said second cup shaped member and having an outwardly extending peripheral bead turned over said flanged periphery of said second cup shaped member and positioned between the shoulder portion of said first cup shaped member and said flanged periphery of said second cup shaped member, nut means positioned over said threaded hub portion adjacent said first member and operative to draw said first and second members together and clamp the beaded periphery of said diaphragm between said members, an air conduit means integral with said second member and extending through the aperture in the end surface of said first member providing an air passage to a chamber formed between said diaphragm and said second member, a spring retaining plate positioned on the under surface of said diaphragm, spring means positioned between said plate and said base member, and means associated with said spring retaining plate and adapted to connect an operating lever of the device to be operated by said actuator, inlead conduit positioned in said base, and flexible conduit means connecting said inlead conduit means to said air conduit integral with said second member.

4. A pneumatic actuator comprising, a circular base member with a centrally located aperture therein and a plurality of upstanding flange portions, a first cup shaped member having a shoulder portion intermediate along its peripheral side extent and a plurality of projections which mount on and are adapted to be secured to said flange portions on said base member, a second cup shaped member fitted into said first member and terminating in an outwardly extending flanged periphery positioned adjacent said shoulder portion of said first member, a threaded hub means integral with said second member and extending outwardly from the center of the closed end of said member and through a centrally located aperture in said first member, a cup shaped diaphragm fitted into said second cup shaped member and having an outwardly extending peripheral bead turned over said flanged periphery of said second cup shaped member and positioned between the shoulder portion of said first cup shaped member and said flanged periphery of said second cup shaped member and positioned between the shoulder portion of said first cup shaped member and said flanged periphery of said second cup shaped member, nut means positioned over said threaded hub portion adjacent said first member and operative to draw said first and second members together and clamp the beaded periphery of said diaphragm between said members, an air conduit means integral with said second member and extending through the aperture in the end surface of said first member providing an air passage to a chamber formed between said diaphragm and said second member, a spring retaining plate positioned on the under surface of said diaphragm, spring means positioned between said plate and said base member, means positioned adjacent said spring retaining plate and adapted to connect an operating lever of the device to be operated by said actuator, and a threaded aperture in said base concentrically located with respect to said connecting means to provide a mounting for said actuator on a device and a passage for the connection of the device to the actuator.

References Cited in the file of this patent

UNITED STATES PATENTS

| | | |
|---|---|---|
| 2,671,470 | Boteler | Mar. 9, 1954 |
| 2,761,427 | Shumaker | Sept. 4, 1956 |
| 2,770,442 | Demay | Nov. 13, 1956 |